United States Patent
Itano et al.

(10) Patent No.: US 11,421,137 B2
(45) Date of Patent: Aug. 23, 2022

(54) REFRIGERANT-CONTAINING COMPOSITION, HEAT TRANSFER MEDIUM, AND HEAT CYCLE SYSTEM

(71) Applicant: DAIKIN INDUSTRIES, LTD., Osaka (JP)

(72) Inventors: Mitsushi Itano, Osaka (JP); Hitomi Kuroki, Osaka (JP); Kazuhiro Takahashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/251,514

(22) PCT Filed: Jun. 12, 2019

(86) PCT No.: PCT/JP2019/023384
§ 371 (c)(1),
(2) Date: Dec. 11, 2020

(87) PCT Pub. No.: WO2019/240205
PCT Pub. Date: Dec. 19, 2019

(65) Prior Publication Data
US 2021/0246348 A1 Aug. 12, 2021

(30) Foreign Application Priority Data
Jun. 12, 2018 (JP) .............................. JP2018-112060

(51) Int. Cl.
*C09K 5/04* (2006.01)
(52) U.S. Cl.
CPC ........ *C09K 5/045* (2013.01); *C09K 2205/106* (2013.01); *C09K 2205/126* (2013.01); *C09K 2205/40* (2013.01)
(58) Field of Classification Search
CPC ........ C09K 2205/126; C09K 2205/106; C09K 5/044; C09K 2205/122; C09K 2205/128; C09K 2205/22; C09K 2205/40
See application file for complete search history.

(56) References Cited

U.S. PATENT DOCUMENTS

| | | |
|---|---|---|
| 2007/0210276 A1 | 9/2007 | Luly et al. |
| 2010/0044619 A1 | 2/2010 | Hulse et al. |
| 2010/0044620 A1 | 2/2010 | Rached |
| 2017/0002245 A1 | 1/2017 | Fukushima |
| 2018/0079941 A1 | 3/2018 | Ueno et al. |

FOREIGN PATENT DOCUMENTS

| | | |
|---|---|---|
| JP | 8-277389 | 10/1996 |
| JP | 2007-310868 | 11/2007 |
| JP | 2009-24152 | 2/2009 |
| JP | 2010-47754 | 3/2010 |
| JP | 2010-513646 | 4/2010 |
| JP | 2011-256361 | 12/2011 |
| JP | 2012-510550 | 5/2012 |
| JP | 2014-525975 | 10/2014 |
| JP | 2016-531177 | 10/2016 |
| JP | 2018-508597 | 3/2018 |
| WO | 2010/064005 | 6/2010 |
| WO | 2011/144885 | 11/2011 |
| WO | 2013/021174 | 2/2013 |
| WO | 2015/015188 | 2/2015 |
| WO | 2015/141678 | 9/2015 |
| WO | 2016/120645 | 8/2016 |
| WO | 2016/194847 | 12/2016 |
| WO | 2018/204860 | 11/2018 |

OTHER PUBLICATIONS

International Search Report dated Jul. 16, 2019 in International (PCT) Application No. PCT/JP2019/023384.
Extended European Search Report dated Feb. 14, 2022 in corresponding European Patent Application No. 19820534.6.

*Primary Examiner* — John R Hardee
(74) *Attorney, Agent, or Firm* — Wenderoth, Lind & Ponack, L.L.P.

(57) ABSTRACT

The present invention provides a composition comprising a refrigerant (mixed refrigerant) having three types of performance, i.e., a coefficient of performance (COP) and refrigerating capacity (Cap) that are equivalent to or higher than those of R410A, and a sufficiently low GWP. Specifically, the present invention provides a composition comprising a refrigerant, the refrigerant comprising $CF_3I$, $CO_2$ (R744), and at least one compound A selected from the group consisting of trifluoroethylene (HFO-1123), trans-1,2-difluoroethylene [(E)-RFC-1132], cis-1,2-difluoroethylene [(Z)-HFO-1132], fluoroethylene (HFO-1141), and 3,3,3-trifluoropropyne (TFP).

6 Claims, No Drawings

REFRIGERANT-CONTAINING COMPOSITION, HEAT TRANSFER MEDIUM, AND HEAT CYCLE SYSTEM

TECHNICAL FIELD

The present disclosure relates to a composition comprising a refrigerant, a heat transfer medium, and a heat cycle system.

BACKGROUND ART

R410A is currently used as an air conditioning refrigerant for home air conditioners etc. R410A is a two-component mixed refrigerant of difluoromethane ($CH_2F_2$: R32) and pentafluoroethane ($C_2HF_5$: R125), and is a pseudo-azeotropic composition.

However, R410A has a global warming potential (GWP) of 2088. Due to the growing concerns about global warming, R32, which has a GWP of 675, has been increasingly used. For this reason, various low-GWP mixed refrigerants that can replace R410A have been proposed (PTL 1).

Further, as the prior art related to the present disclosure, PTL 2, PTL 3, and the like disclose refrigerant compositions comprising trifluoroiodomethane ($CF_3I$).

CITATION LIST

Patent Literature

PTL 1: WO2015/141678
PTL 2: JP2009-24152A
PTL 3: JPH08-277389A

SUMMARY OF INVENTION

Technical Problem

The present inventors performed independent examination, and conceived of the idea that no prior art had developed refrigerant compositions (mixed refrigerants) having three types of performance, i.e., a coefficient of performance (COP) and refrigerating capacity (also referred to as "cooling capacity" and "capacity (Cap)") that are equivalent to or higher than those of R410A and that allow them to serve as alternative refrigerants for R410A, and a sufficiently low GWP. An object of the present disclosure is to solve this unique problem.

Solution to Problem

The present disclosure provides inventions according to the following aspects.

1. A composition comprising a refrigerant,
the refrigerant comprising $CO_2$ (R744), and at least one compound A selected from the group consisting of trifluoroethylene (HFO-1123), trans-1,2-difluoroethylene [(E)-HFO-1132], cis-1,2-difluoroethylene [(Z)-HFO-1132], fluoroethylene (HFO-1141), and 3,3,3-trifluoropropyne (TFP).

2. A composition comprising a refrigerant,
the refrigerant comprising $CF_3I$, $CO_2$ (R744), HFC-32, and at least one compound A selected from the group consisting of trifluoroethylene (HFO-1123), trans-1,2-difluoroethylene [(E)-HFO-1132], cis-1,2-difluoroethylene [(Z)-HFO-1132], fluoroethylene (HFO-1141), and 3,3,3-trifluoropropyne (TFP).

3. A composition comprising a refrigerant, the refrigerant comprising $CF_3I$, $CO_2$ (R744), and HFC-32, and HFC-32 being contained in an amount of 30 mass % or more in the refrigerant.

4. The composition according to any one of Items 1 to 3, wherein the refrigerant further comprises at least one compound B selected from the group consisting of tetrafluoromethane (FC-14), trifluoromethane (HFC-23), pentafluoroethane (HFC-125), 1,1,1,2-tetrafluoroethane (HFC-134a), 1,1,2,2-tetrafluoroethane (HFC-134), 1,1-difluoroethane (HFC-152a), 1,2-difluoroethane (HFC-152), 1,1,1-trifluoroethane (HFC-143a), 1,1,2-trifluoroethane (HFC-143), 1,1,1,2,3,3,3-heptafluoropropane (HFC-227ea), 2,3,3,3-tetrafluoropropene (HFO-1234yf), trans-1,3,3,3-tetrafluoropropene [(E)-HFO-1234ze], 1,2,3,3,3-pentafluoropropene (HFO-1225ye), 3,3,3-trifluoropropene (HFO-1243zf), and difluoropropene (HFO-1252).

5. The composition according to Item 1, wherein the refrigerant comprises $CF_3I$ and $CO_2$ in a total amount of 0.1 to 90 mass %, and compound A in an amount of 10 to 99.9 mass %, based on the total amount of $CF_3I$, $CO_2$, and compound A taken as 100 mass %.

6. The composition according to Item 2, wherein the refrigerant comprises $CF_3I$, $CO_2$, and HFC-32 in a total amount of 0.1 to 90 mass %, and compound A in an amount of 10 to 99.9 mass %, based on the total amount of $CF_3I$, $CO_2$, HFC-32, and compound A taken as 100 mass %.

7. The composition according to any one of Items 1 to 6, for use as an alternative refrigerant for R410A.

8. The composition according to any one of Items 1 to 7, for use as a working fluid for a refrigerating machine, wherein the composition further comprises a refrigeration oil.

9. A refrigerating machine comprising the composition according to any one of Items 1 to 8 as a working fluid.

10. A heat transfer medium comprising the composition according to any one of Items 1 to 8.

11. A heat cycle system using the heat transfer medium according to Item 10.

Advantageous Effects of Invention

The refrigerant (mixed refrigerant) according to the present disclosure has three types of performance, i.e., a coefficient of performance (COP) and refrigerating capacity (Cap) that are equivalent to or higher than those of R410A, and a sufficiently low GWP. A composition comprising the refrigerant according to the present disclosure is suitable, for example, as a working fluid for a refrigerating machine.

DESCRIPTION OF EMBODIMENTS

The present inventors conducted intensive studies to solve the above problem, and consequently found that a refrigerant with a specific formulation comprising $CF_3I$ and $CO_2$ (R744) (mixed refrigerant) has the properties described above, and that a composition comprising the refrigerant is suitable, for example, as a working fluid for a refrigerating machine.

The present disclosure has been completed as a result of further research based on this finding. The present disclosure includes the following embodiments.

Definition of Terms

In the present specification, the term "refrigerant" includes at least compounds that are specified in ISO 817

(International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given.

Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil.

In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make the temperature thereof lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, the term "temperature glide" can be rephrased as an absolute value of the difference between the starting temperature and the ending temperature of the phase change process of the composition comprising a refrigerant according to the present disclosure within the constituent elements of a heat cycle system.

1. Refrigerant 1-1. Refrigerant Component

The refrigerants according to the present disclosure can be roughly classified into Embodiments 1 to 3 (also referred to as refrigerants 1 to 3, respectively). All of refrigerants 1 to 3 have three types of performance, i.e., a coefficient of performance (COP) and refrigerating capacity (Cap) that are equivalent to or higher than those of R410A, and a sufficiently low GWP. Compositions comprising these refrigerants are useful, for example, as working fluids for refrigerating machines. Refrigerants 1 to 3 are described below.

In the present disclosure, the coefficient of performance (COP) equivalent to or higher than that of R410A means that the COP ratio relative to R410A is 95% or higher (preferably 100% or higher), and the refrigerating capacity (Cap) equivalent to or higher than that of R410A means that the refrigerating capacity ratio relative to R410A is 75% or higher (preferably 90% or higher, more preferably 95% or higher, and most preferably 100% or higher). Further, the sufficiently low GWP means that the GWP is 750 or less, preferably 650 or less, more preferably 400 or less, even more preferably 150 or less, and most preferably 1 or less.

Embodiment 1: Refrigerant 1

Refrigerant 1 is characteristically a mixed refrigerant comprising $CF_3I$, $CO_2$ (R744), and at least one compound A selected from the group consisting of trifluoroethylene (HFO-1123), trans-1,2-difluoroethylene [(E)-HFO-1132], cis-1,2-difluoroethylene [(Z)-HFO-1132], fluoroethylene (HFO-1141), and 3,3,3-trifluoropropyne ($CF_3CH \equiv CH$; TFP). That is, refrigerant 1 comprises and compound A as essential components, and compound A is at least one selected from those listed above.

Due to this structure, refrigerant 1 has three types of performance, i.e., a coefficient of performance (COP) and refrigerating capacity (Cap) that are equivalent to or higher than those of R410A, and a sufficiently low GWP.

Examples of compound A according to the present disclosure include HFO-1123, (E)-HFO-1132, (Z)-HFO-1132, HFO-1141, and TFP. These compounds A may be used singly or in combination of two or more.

When compound A is used singly, among the above compounds A, HFO-1123, (E)-HFO-1132, or HFO-1141 is preferable, and HFO-1123 or (E)-HFO-1132 is more preferable, from the viewpoint of having a COP equivalent to that of R410A and a refrigerating capacity almost equivalent to that of R410A.

When two or more compounds A are used in combination, it is preferable to use at least two compounds of HFO-1123, (E)-HFO-1132, and HFC-1141, from the viewpoint of having a COP equivalent to that of R410A and a refrigerating capacity almost equivalent to that of R410A.

Refrigerant 1 is preferably a mixed refrigerant comprising $CF_3I$ and $CO_2$ in a total amount of 0.1 to 90 mass %, and compound A in an amount of 10 to 99.9 mass %, based on the total amount of $CF_3I$, $CO_2$, and compound A taken as 100 mass %.

In particular, refrigerant 1 is more preferably a mixed refrigerant comprising $CF_3I$ and CO: in a total amount of 40 to 70 mass %, and compound A in an amount of 30 to 60 mass. In this case, refrigerant 1 has a GWP of 1 or less, a COP ratio of 100% or higher, and a refrigerating capacity ratio of 75% or higher, and is a mixed refrigerant more suitable as an alternative refrigerant for R410A.

Refrigerant 1 preferably comprises 20 to 69 mass % of $CF_3I$, 1 to 10 mass % of $CO_2$, and 30 to 70 mass % of compound A.

Embodiment 2: Refrigerant 2

Refrigerant 2 is characteristically a mixed refrigerant comprising $CF_3I$, $CO_2$ (R744), HFC-32, and at least one compound A selected from the group consisting of trifluoroethylene (HFO-1123), trans-1,2-difluoroethylene [(E)-HFO-1132], cis-1,2-difluoroethylene [(Z)-HFO-1132], fluoroethylene (HFO-1141), and 3,3,3-trifluoropropyne (TFP). That is, refrigerant 2 comprises $CF_3I$, $CO_2$, HFC-32, and compound A as essential components, and compound A is at least one selected from those listed above.

Due to this structure, refrigerant 2 has three types of performance, i.e., a coefficient of performance (COP) and refrigerating capacity (Cap) that are equivalent to or higher than those of R410A, and a sufficiently low GWP.

As with refrigerant 1, examples of compound A according to the present disclosure include HFO-1123, (E)-HFO-1132, (Z)-HFO-1132, HFO-1141, and TFP. These compounds A may be used singly or in combination of two or more.

When compound A is used singly, among the above compounds A, HFO-1123, (E)-HFO-1132, or HFO-1141 is preferable, and HFO-1123 or (E)-HFO-1132 is more preferable, from the viewpoint of having a COP equivalent to that of R410A and a refrigerating capacity almost equivalent to that of R410A.

When two or more compounds A are used in combination, it is preferable to use at least two compounds of HFO-1123, (E)-HFO-1132, and HFO-1141, from the viewpoint of having a COP equivalent to that of R410A and a refrigerating capacity almost equivalent to that of R410A.

Refrigerant 2 is preferably a mixed refrigerant comprising $CF_3I$, $CO_2$, and HFC-32 in a total amount of 0.1 to 90 mass %, and compound A in an amount of 10 to 99.9 mass %, based on the total amount of $CF_3I$, $CO_2$, HFC-32, and compound A taken as 100 mass %.

In particular, refrigerant 2 is more preferably a mixed refrigerant comprising $CF_3I$, $CO_2$, and HFC-32 in a total amount of 70 to 90 mass %, and compound A in an amount of 10 to 30 mass %. In this case, refrigerant 2 has a GWP of 150 or less, a COP ratio of 95% or higher, and a refrigerating capacity ratio of 90% or higher, and is a mixed refrigerant more suitable as an alternative refrigerant for R410A.

Refrigerant 2 preferably comprises 38 to 69 mass % of $CF_3I$, 1 to 10 mass % of $CO_2$, 15 to 22 mass % of HFC-32, and 15 to 30 mass % of compound A.

Embodiment 3: Refrigerant 3

Refrigerant 3 is characteristically a mixed refrigerant comprising $CF_3I$, $CO_2$ (R744), and HFC-32, wherein HFC-32 is contained in an amount of 30 mass % or more in the refrigerant. That is, it is essential for refrigerant 3 that it is a mixed refrigerant comprising $CF_3I$, $CO_2$, and HFC-32, and that HFC-32 is contained in an amount of 30 mass % or more in the refrigerant.

In refrigerant 3, the HFC-32 content of the refrigerant may be 30 mass % or more, and is more preferably 40 mass % or more. The upper limit of the HFC-32 content of the refrigerant is about 60 mass %.

Compound B that can be Added to Embodiments 1 to 3 (Refrigerants 1 to 3)

In addition to the components described above, refrigerants 1 to 3 may further comprise at least one compound B selected from the group consisting of tetrafluoromethane (FC-14), trifluoromethane (HFC-23), pentafluoroethane (HFC-125), 1,1,1,2-tetrafluoroethane (HFC-134a), 1,1,2,2-tetrafluoroethane (HFC-134), 1,1-difluoroethane (HFC-152a), 1,2-difluoroethane (RFC-152), 1,1,1-trifluoroethane (HFC-143a), 1,1,2-trifluoroethane (HFC-143), 1,1,1,2,3,3,3-heptafluoropropane (HFC-227ea), 2,3,3,3-tetrafluoropropene (HFO-1234y1), trans-1,3,3,3-tetrafluoropropene [(E)-HFO-1234ze], 1,2,3,3,3-pentafluoropropene (HFO-1225ye), 3,3,3-trifluoropropene (HFO-1243zf), and difluoropropene (HFO-1252). In this case, compound B is contained within a range in which it does not impair the three types of performance of refrigerants 1 to 3, i.e., a coefficient of performance (COP) and refrigerating capacity (Cap) that are equivalent to or higher than those of R410A, and a sufficiently low GWP.

Examples of compound B according to the present disclosure include FC-14, HFC-23, HFC-125, HFC-134a, HFC-134, HFC-152a, HFC-152, HFC-143a, HFC-143, HFC-227ea, HFO-1234yf, (E)-HFO-1234ze, HFO-1225ye, HFO-1243zf, and HFO-1252. Compounds B may be used singly or in combination of two or more.

When compound B is used, among the above compounds B, at least one of HFC-125, HFO-1234yf, and (E)-HFO-1234ze is preferable, from the viewpoint of GWP, COP, and refrigerating capacity. Further, from the viewpoint of non-flammability, HFC-125 (boiling point: −48.1° C.) is more preferable because it is a non-flammable refrigerant whose boiling point is close to that of HFC-32 (boiling point: −52° C.)

When containing compound B, refrigerants 1 to 3 according to the present disclosure are preferably the mixed refrigerants shown in (1) to (3) below, respectively, when the total amount of $CF_3I$, $CO_2$, HFC-32, compound A, and compound B is 100 mass %.

(1) (In the case of refrigerant 1) a mixed refrigerant comprising 25 to 65 mass % of $CF_3I$ and $CO_2$, 30 to 60 mass % of (E)-HFO-1132 and/or HFO-1123 as compound A, and 5 to 15 mass % of HFO-1234yf and/or (E)-HFO-1234ze as compound B, based on the total amount of $CF_3I$, $CO_2$, compound A, and compound B taken as 100 mass %.

(2) (In the case of refrigerant 2) a mixed refrigerant comprising 30 to 45 mass % of $CF_3I$ and $CO_2$, 30 to 50 mass % of HFC-32, 0 to 12.5 mass % of HFC-125 as compound B, and the balance being R1234yf, based on the total amount of $CF_3I$, $CO_2$, HFC-32, compound A, and compound B taken as 100 mass %.

(3) (In the case of refrigerant 3) a mixed refrigerant comprising 30 to 45 mass % of $CF_3I$ and $CO_2$, 30 to 50 mass % of HFC-32, 0 to 12.5 mass % of HFC-125 as compound B, and the balance being HFO-1234yf and/or (E)-HFO-1234ze, based on the total amount of $CF_3I$, 002, 30 mass % or more of HFC-32, and compound B taken as 100 mass %.

Mixed Refrigerants Further Comprising Other Additional Refrigerants

Refrigerants 1 to 3 according to the present disclosure may be mixed refrigerants further comprising other additional refrigerants, in addition to $CO_2$, $CF_3I$, compound A, and compound B, within a range in which the above characteristics and effects are not impaired. In this case, the total amount of $CO_2$, $CF_3I$, compound A, and compound B is preferably 99.5 mass % or more and less than 100 mass %, more preferably 99.75 mass % or more and less than 100 mass %, and even more preferably 99.9 mass % or more and less than 100 mass %, based on the entire refrigerant according to the present disclosure.

The above additional refrigerants are not limited, and can be selected from a wide range of known refrigerants that are widely used in this field. The mixed refrigerants may comprise a single additional refrigerant, or two or more additional refrigerants.

1-2. Use

The refrigerant according to the present disclosure can be preferably used as a working fluid in a refrigerating machine.

Compositions comprising the refrigerant according to the present disclosure are suitable for use as HFC refrigerants, such as R410A, R407C, and R404A, and as alternative refrigerants for HCFC refrigerants, such as R22. Among these, the compositions comprising the refrigerant according to the present disclosure are particularly suitable for use as alternative refrigerants for R410A.

2. Refrigerant Composition

The refrigerant composition according to the present disclosure comprises at least the refrigerant according to the present disclosure, and can be used for the same use as the refrigerant according to the present disclosure.

Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary.

As described above, when the refrigerant composition according to the present disclosure is used as a working fluid in a refrigerating machine, it is generally used as a mixture with at least a refrigeration oil.

Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, more preferably 0 to 0.5 mass, even more preferably 0 to 0.25 mass %, and particularly preferably 0 to 0.1 mass %.

2-1. Water

The refrigerant composition according to the present disclosure may contain a small amount of water.

The water content of the refrigerant composition is preferably 0 to 0.1 mass %, more preferably 0 to 0.075 mass %, even more preferably 0 to 0.05 mass %, and particularly preferably 0 to 0.025 mass %, based on the entire refrigerant.

A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition. From the viewpoint of obtaining the above effect due to inclusion of water, the lower limit of the water content is about 0.001 mass %. For example, the water content can be adjusted within the range of 0.001 to 0.1 mass %, 0.001 to 0.075 mass %, 0.001 to 0.05 mass %, or 0.001 to 0.025 mass %.

2-2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. It is preferable to select, as the tracer, a compound that cannot become an impurity inevitably mixed in the refrigerant according to the present disclosure.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). Among these, the tracer is preferably a hydrofluorocarbon, a hydrochlorofluorocarbon, a chlorofluorocarbon, a hydrochlorocarbon, a fluorocarbon, or a fluoroether.

Specifically, the following compounds (hereinafter also referred to as tracer compounds) are more preferable as the tracer.

HCC-40 (chloromethane, $CH_3Cl$)
HFC-41 (fluoromethane, $CH_3F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present at a total concentration of 10 parts per million by weight (ppm) to 1000 ppm in the refrigerant composition. The tracer compound is preferably present at a total concentration of 30 ppm to 500 ppm, more preferably 50 ppm to 300 ppm, even more preferably 75 ppm to 250 ppm, and particularly preferably 100 ppm to 200 ppm, in the refrigerant composition.

2-3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Among these, naphthalimide and coumarin are preferable.

2-4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole, in addition to the nitro compounds, ethers, and amines mentioned above.

The content of the stabilizer is not limited. Generally, the content of the stabilizer is 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

The method for evaluating the stability of the refrigerant composition according to the present disclosure is not limited, and it can be evaluated by a commonly used method. An example of such a method is a method of evaluating the amount of free fluorine ions as an index according to ASHRAE Standard 97-2007. In addition, there is also an evaluation method using the total acid number as an index. This method can be performed, for example, according to ASTM D 974-06.

2-5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition.

The content of the refrigeration oil is not limited. Generally, the content of the refrigeration oil is 10 to 50 mass %, preferably 12.5 to 45 mass %, more preferably 15 to 40 mass %, even more preferably 17.5 to 35 mass %, and particularly preferably 20 to 30 mass %, based on the entire refrigeration oil-containing working fluid.

3-1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture of refrigerants according to the present disclosure (mixed refrigerant according to the present disclosure) and the stability of the mixed refrigerant according to the present disclosure, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil.

The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3-2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. Among these, the compatibilizing agent is preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating, as a working fluid, the composition comprising the refrigerant according to the present disclosure in a refrigerating machine.

5. Heat Transfer Medium and Heat Cycle System Using Heat Transfer Medium

The heat transfer medium according to the present disclosure comprises the composition containing a refrigerant according to the present disclosure.

The heat transfer medium according to the present disclosure can be suitably used for various heat cycle systems. A heat cycle system with high cooling capacity can be obtained by comprising the heat transfer medium according to the present disclosure.

Moreover, since the refrigerant according to the present disclosure has a sufficiently low GWP, a high degree of safety can be imparted to a heat cycle system by comprising the heat transfer medium according to the present disclosure, compared with the case of using an existing refrigerant.

Further, since the heat transfer medium according to the present disclosure has a low temperature glide, a highly stable heat cycle system can be provided.

The type of heat cycle system is not limited. Examples of heat cycle systems include room air conditioners, packaged air conditioners for stores, packaged air conditioners for buildings, packaged air conditioners for facilities, separate air conditioners connected with one or more indoor units and outdoor units through a refrigerant pipe, window air conditioners, portable air conditioners, rooftop or central air conditioners that send cool or warm air through a duct, gas engine heat pumps, air conditioners for trains, air conditioners for automobiles, built-in showcases, separate showcases, refrigerator-freezers for businesses, ice machines, integrated refrigerating machines, vending machines, automobile air conditioners, refrigerating machines for cooling containers or refrigerators such as for marine shipping, chiller units, turbo refrigerating machines, and apparatuses exclusively used for a heating cycle. Examples of apparatuses exclusively used for a heating cycle include water-heating devices, floor-heating devices, snow-melting devices, and the like.

As long as the heat cycle systems listed above comprise the heat transfer medium according to the present disclosure, the other features of the heat cycle systems are not limited. For example, such a heat cycle system may have a structure similar to that of a known heat cycle system.

EXAMPLES

The present disclosure is described in more detail below with reference to Examples. However, the present disclosure is not limited to the Examples.

Examples 1 to 20 and Comparative Examples 1 to 13

The GWP of the mixed refrigerants shown in the Examples and Comparative Examples, and the GWP of R410A (R32=50%/R125=50%) were evaluated based on the values stated in the Intergovernmental Panel on Climate Change (IPCC), fourth report.

Further, the COP and refrigerating capacity of the mixed refrigerants shown in the Examples and Comparative Examples, and the COP and refrigerating capacity of R410A were determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 45° C.
Condensation temperature: 5° C.
Superheating temperature: 5K
Subcooling temperature: 5K
Compressor efficiency: 70%

Further, Tables 1 to 6 show the GWP, COP, and refrigerating capacity calculated based on these results. The COP ratio and the refrigerating capacity ratio refer to ratios (%) relative to R410A.

The coefficient of performance (COP) was calculated according to the following equation.

COP=(refrigerating capacity or heating capacity)/amount of electrical power consumed

TABLE 1

| Example/Comparative Example | Composition ratio (mass %) | | | | | Evaluation results | | |
|---|---|---|---|---|---|---|---|---|
| | $CO_2$ | $CF_3I$ | E-HFO-1132 | HFO-1123 | GWP | COP ratio (%) (relative to R410A) | Refrigerating capacity ratio (%) (relative to R410A) | Temperature glide (K) |
| Comparative Example 1 | | R410A | | | 2088 | 100 | 100 | 0.1 |
| Comparative Example 2 | 0.0 | 64.0 | 36.0 | 0.0 | 1 | 106.2 | 66.4 | 9.9 |
| Example 1 | 2.5 | 61.5 | 36.0 | 0.0 | 1 | 102.9 | 76.3 | 16.3 |
| Comparative Example 3 | 0.0 | 60.0 | 0.0 | 40.0 | 0.7 | 104.2 | 70.2 | 13.4 |
| Example 2 | 2.5 | 57.5 | 0.0 | 40.0 | 0.7 | 102.0 | 79.3 | 18.0 |
| Comparative Example 4 | 0.0 | 64.0 | 16.0 | 20.0 | 0.9 | 105.3 | 68.5 | 13.3 |
| Example 3 | 2.5 | 61.5 | 16.0 | 20.0 | 0.9 | 103.0 | 77.5 | 18.5 |

TABLE 2

| Example/Comparative Example | Composition ratio (mass %) | | | | | | Evaluation results | | |
|---|---|---|---|---|---|---|---|---|---|
| | $CO_2$ | $CF_3I$ | E-HFO-1132 | HFO-1123 | HFC-32 | GWP | COP ratio (%) (relative to R410A) | Refrigerating capacity ratio (%) (relative to R410A) | Temperature glide (K) |
| Comparative Example 1 | | R410A | | | | 2088 | 100 | 100 | 0.1 |
| Comparative Example 2 | 0.0 | 0.0 | 0.0 | 0.0 | 100.0 | 675 | 102.4 | 109.8 | 0.0 |
| Comparative Example 5 | 0.0 | 60.0 | 18.0 | 0.0 | 22.0 | 149 | 99.3 | 87.5 | 9.3 |
| Example 4 | 2.5 | 57.5 | 18.0 | 0.0 | 22.0 | 149 | 97.8 | 93.5 | 10.4 |
| Example 5 | 5.0 | 55.0 | 18.0 | 0.0 | 22.0 | 149 | 96.4 | 99.4 | 11.2 |
| Comparative Example 6 | 0.0 | 60.0 | 0.0 | 18.0 | 22.0 | 149 | 98.6 | 87.6 | 9.0 |
| Example 6 | 2.5 | 57.5 | 0.0 | 18.0 | 22.0 | 149 | 97.3 | 93.5 | 9.9 |
| Example 7 | 5.0 | 55.0 | 0.0 | 18.0 | 22.0 | 149 | 96.1 | 99.4 | 10.5 |
| Comparative Example 7 | 0.0 | 60.0 | 9.0 | 9.0 | 22.0 | 149 | 98.7 | 87.8 | 9.2 |
| Example 8 | 2.5 | 57.5 | 9.0 | 9.0 | 22.0 | 149 | 97.4 | 93.8 | 10.1 |

TABLE 3

| Example/Comparative Example | Composition ratio (mass %) | | | | Evaluation results | | |
|---|---|---|---|---|---|---|---|
| | $CO_2$ | $CF_3I$ | HFC-32 | GWP | COP ratio (%) (relative to R410A) | Refrigerating capacity ratio (%) (relative to R410A) | Temperature glide (K) |
| Comparative Example 1 | | R410A | | 2088 | 100 | 100 | 0.1 |
| Comparative Example 2 | 0.0 | 0.0 | 100 | 675 | 102.4 | 109.8 | 0.0 |

TABLE 3-continued

| Example/Comparative Example | Composition ratio (mass %) | | | | Evaluation results | | |
|---|---|---|---|---|---|---|---|
| | CO₂ | CF₃I | HFC-32 | GWP | COP ratio (%) (relative to R410A) | Refrigerating capacity ratio (%) (relative to R410A) | Temperature glide (K) |
| Comparative Example 8 | 0.0 | 60.0 | 40.0 | 271 | 98.7 | 97.0 | 2.7 |
| Example 9 | 1.0 | 59.0 | 40.0 | 271 | 98.5 | 99.1 | 3.0 |
| Example 10 | 2.5 | 57.5 | 40.0 | 271 | 98.2 | 102.1 | 3.5 |
| Example 11 | 5.0 | 55.0 | 40.0 | 271 | 97.7 | 107.3 | 4.3 |
| Example 12 | 10.0 | 50.0 | 40.0 | 271 | 96.6 | 117.6 | 5.7 |

TABLE 4

| Example/Comparative Example | Composition ratio (mass %) | | | | | Evaluation results | | |
|---|---|---|---|---|---|---|---|---|
| | CO₂ | CF₃I | HFC-32 | R125 | GWP | COP ratio (%) (relative to R410A) | Refrigerating capacity ratio (%) (relative to R410A) | Temperature glide (K) |
| Comparative Example 1 | | R410A | | | 2088 | 100 | 100 | 0.1 |
| Comparative Example 2 | 0.0 | 0.0 | 100 | 0.0 | 675 | 102.4 | 109.8 | 0.0 |
| Comparative Example 9 | 0.0 | 50.0 | 40.0 | 10.0 | 621 | 99.6 | 98.7 | 1.5 |
| Example 13 | 1.0 | 49.0 | 40.0 | 10.0 | 621 | 99.4 | 100.6 | 1.9 |
| Example 14 | 2.5 | 47.5 | 40.0 | 10.0 | 621 | 99.0 | 103.6 | 2.5 |
| Example 15 | 5.0 | 45.0 | 40.0 | 10.0 | 621 | 98.3 | 108.5 | 3.4 |
| Example 16 | 10.0 | 40.0 | 40.0 | 10.0 | 621 | 96.8 | 118.4 | 4.9 |

TABLE 5

| Example/Comparative Example | Composon ratio (mass %) | | | | | | | Evaluation results | | |
|---|---|---|---|---|---|---|---|---|---|---|
| | CO₂ | CF₃I | E-HFO-1132 | HFO-1123 | HFO-1234yf | HFO-1234ze | GWP | COP ratio (%) (relative to R410A) | Refrigerating capacity ratio (%) (relative to R410A) | Temperature glide (K) |
| Comparative Example 1 | | R410A | | | | | 2088 | 100 | 100 | 0.1 |
| Comparative Example 10 | 0.0 | 54.0 | 36.0 | 0.0 | 10.0 | 0.0 | 1.3 | 105.6 | 66.1 | 9.1 |
| Example 17 | 2.5 | 51.5 | 36.0 | 0.0 | 10.0 | 0.0 | 1.3 | 102.9 | 75.3 | 15.1 |
| Comparative Example 11 | 0.0 | 50.0 | 0.0 | 40.0 | 0.0 | 10.0 | 1.5 | 103.8 | 69.1 | 12.0 |
| Example 18 | 2.5 | 47.5 | 0.0 | 40.0 | 0.0 | 10.0 | 1.5 | 101.8 | 77.5 | 17.7 |

TABLE 6

| Example/Comparative Example | Composition ratio (mass %) | | | | | | | Evaluation results | | |
|---|---|---|---|---|---|---|---|---|---|---|
| | CO₂ | CF₃I | HFC-32 | HFC-125 | HFO-1234yf | HFO-1234ze | GWP | COP ratio (%) (relative to R410A) | Refrigerating capacity ratio (%) (relative to R410A) | Temperature glide (K) |
| Comparative Example 1 | | | R410A | | | | 2088 | 100 | 100 | 0.1 |
| Comparative Example 2 | 0.0 | 0.0 | 100.0 | 0.0 | 0.0 | 0.0 | 675 | 102.4 | 109.8 | 0.0 |
| Comparative Example 12 | 0.0 | 35.0 | 47.0 | 10.0 | 6.0 | 0.0 | 738 | 100.4 | 99.6 | 1.0 |
| Example 19 | 2.5 | 32.5 | 47.0 | 10.0 | 6.0 | 0.0 | 738 | 99.6 | 104.3 | 2.1 |
| Comparative Example 13 | 0.0 | 36.5 | 47.5 | 12.0 | 0.0 | 4.0 | 741 | 100.3 | 99.5 | 1.2 |
| Example 20 | 2.5 | 34.0 | 47.5 | 12.0 | 0.0 | 4.0 | 741 | 99.5 | 104.1 | 2.1 |

The invention claimed is:

1. A composition comprising a refrigerant,
the refrigerant comprising $CF_3I$, $CO_2$ (R744), and at least one compound A selected from the group consisting of trifluoroethylene (HFO-1123) and trans-1, 2-difluoroethylene [(E)-HFO-1132],
wherein the refrigerant comprises $CF_3I$ in an amount of 57.5 to 61.5 mass %, and $CO_2$ in an amount of 1 to 10 mass %, based on the total amount of $CF_3I$, $CO_2$, and compound A taken as 100 mass %.

2. The composition according to claim 1, for use as an alternative refrigerant for R410A.

3. The composition according to claim 1, for use as a working fluid for a refrigerating machine, wherein the composition further comprises a refrigeration oil.

4. A refrigerating machine comprising the composition according to claim 1 as a working fluid.

5. A heat transfer medium comprising the composition according to claim 1.

6. A heat cycle system using the heat transfer medium according to claim 5.

\* \* \* \* \*